Nov. 29, 1966  J. M. CLAPP  3,288,330
APPARATUS FOR STORING AND FEEDING SMALL MECHANICAL PARTS
Filed Aug. 12, 1965  3 Sheets-Sheet 1

INVENTOR.
JOHN M. CLAPP

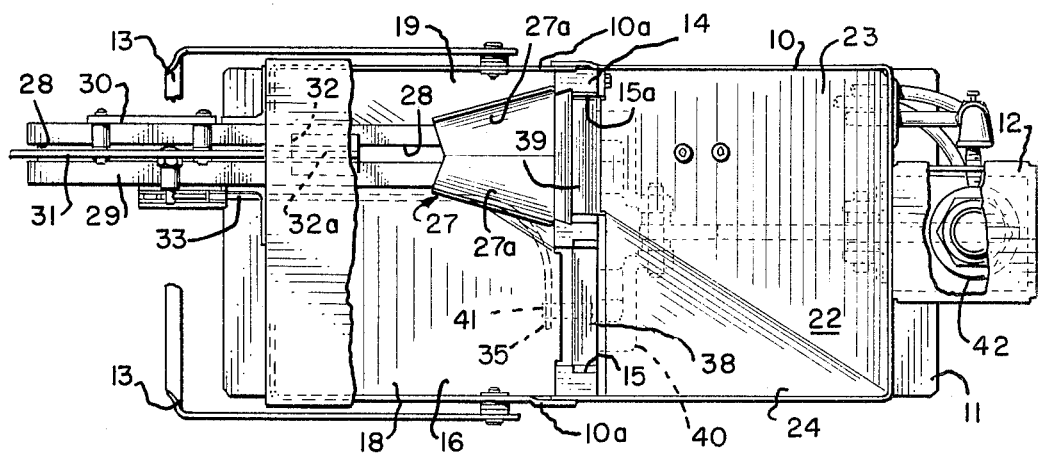
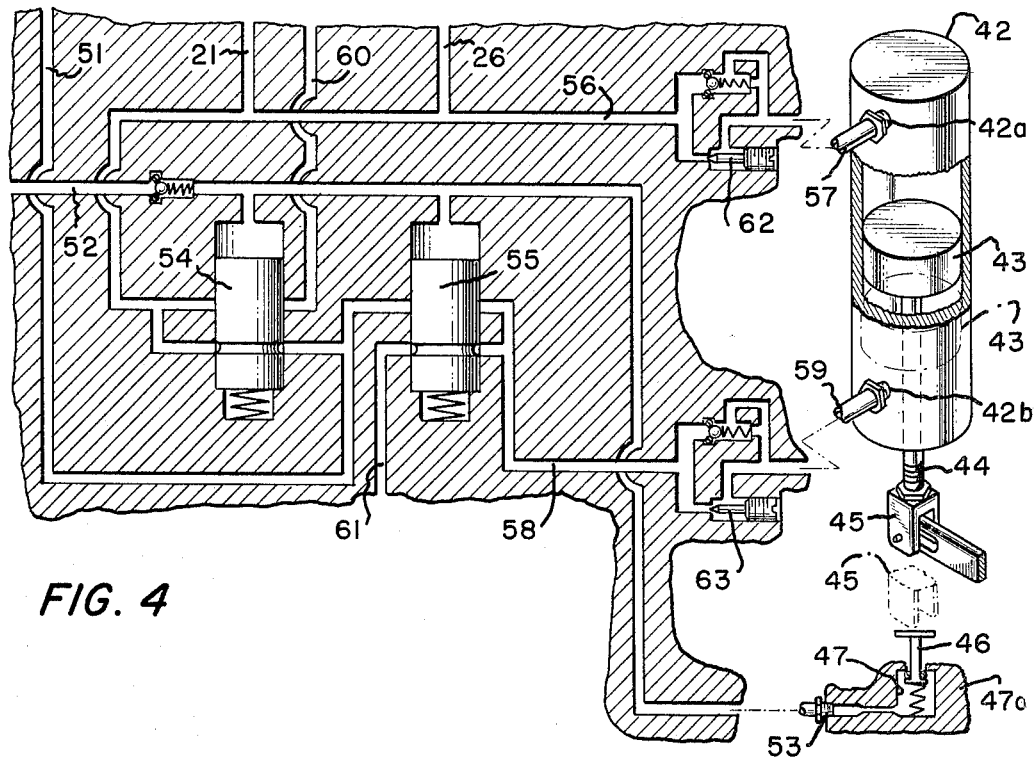

INVENTOR.
JOHN M. CLAPP

United States Patent Office 3,288,330
Patented Nov. 29, 1966

3,288,330
APPARATUS FOR STORING AND FEEDING SMALL MECHANICAL PARTS
John Madison Clapp, Athens, Pa., assignor to Ingersoll-Rand Company, New York, N.Y., a corporation of New Jersey
Filed Aug. 12, 1965, Ser. No. 479,237
16 Claims. (Cl. 221—174)

This invention relates to apparatus for storing and feeding small mechanical parts and to the provision of a new and improved apparatus which, while particularly adapted for storing and feeding fasteners to a power operated insertion tool, is readily and simply adaptable to store and feed other small mechanical parts.

Conventionally, devices for storing fasteners and feeding such to a power operated insertion tool, such as a pneumatic screwdriver, are generally undesirably large in size relative to their fastener storage capacity. These conventional devices, furthermore, usually operate continuously throughout the operation of the power operated insertion tool and, hence, are uneconomical in operation as well as in construction.

An object of the present invention is to provide a new and improved apparatus particularly adapted for storing and feeding fasteners to a power operated insertion tool, such as a pneumatic screwdriver, which apparatus is compact and economical in both construction and operation.

Another object of the invention is to provide a new and improved storage and feeding apparatus of the type set forth which is constructed and arranged to include an unusually large storage capacity relative to its overall size.

Another object is to provide a new and improved storage and feeding apparatus of the type set forth which is constructed and arranged such that the fasteners are transferred from the storage apparatus to the fastener supply line of the power operated insertion tool in a dependable, efficient, and economical manner.

Another object is to provide a new and improved storage and feeding apparatus of the type set forth which, while being particularly adapted for storing fasteners and feeding such to a power operated insertion tool, is readily and simply adaptable to store and feed other small mechanical parts such as pins, balls, nuts, and the like.

Other objects and advantages of the invention will be apparent from the following description taken in connection with the accompanying drawings. It will be understood that changes may be made in the details of construction and arrangement of parts shown and described as the preferred form of the invention has been given by way of illustration only. It will also be understood that, although the present invention has been illustrated and will be described with reference to storing and feeding fasteners to a power operated insertion tool, this application of the invention has been given by way of illustration only. The scope and the spirit of the present invention are not limited to fastener feeding and storage, but rather include the storage and feeding of other small mechanical parts such as pins, balls, nuts, and the like.

Referring to the drawings:

FIG. 2 is a partially broken away, longitudinal view of the storage and feeding apparatus shown in FIG. 1;

FIG. 4 is a schematic view of the pneumatic system for operating the illustrated storage and handling apparatus.

Figure 1:
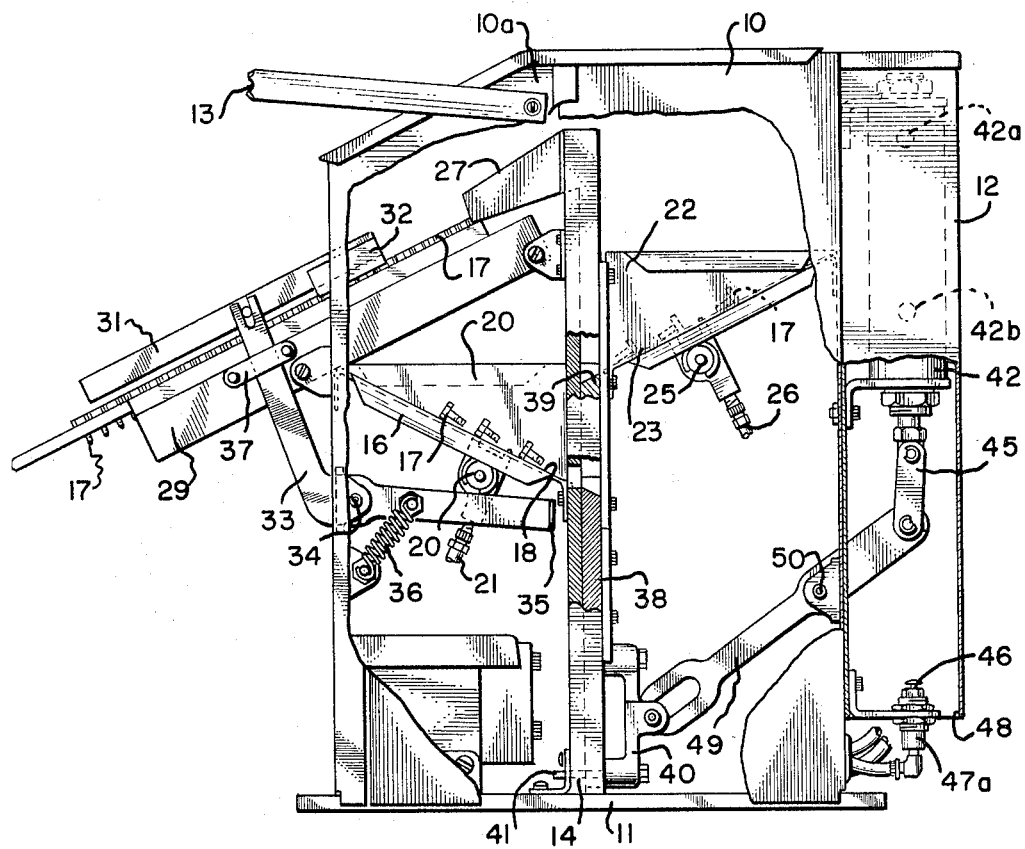
FIG. 1 is an elevational view, partially broken away and in section, of an embodiment of the storage and feeding apparatus.

Referring more particularly to the drawings wherein similar reference characters designate corresponding parts throughout the several views, FIG. 1 illustrates an embodiment of the invention which is particularly adapted for storing headed fasteners, such as screws, and feeding such to a pneumatic insertion tool (not shown). The fastener storage and feeding apparatus is enclosed within a casing formed to include a storage housing 10 having a substantially horizontal base 11 and a cylinder housing 12 which is carried by the storage housing 10. A handle or carrying arm 13 is pivotally connected to two of the walls 10a of the storage housing 10 to facilitate the portability of the fastener storage and feeding apparatus.

An upright or vertical support 14 is carried by the base 11 of the storage housing 10 and includes therein a pair of juxtaposed, vertically extending lift tracks 15 and 15a. A first hopper or storage container 16 adapted for storing a plurality of headed fasteners 17 is carried by the vertical support 14 and the walls 10a of the storage housing 10 on one side of the lift tracks 15 and 15a. The first hopper 16 is supported by the vertical support 14 and the walls 10a in vertically spaced relationship to the base 11 of the storage housing 10 and longitudinally and transversely fills the cavity defined by the vertical support 14 and the walls 10a to prevent the fasteners 17 from falling onto the base 11. The first hopper 16 is formed to include a storage portion 18 which is longitudinally inclined from the vertical support 14 and a lip portion 19 which is transversely inclined from the longitudinally inclined storage portion 18. The longitudinally inclined storage portion 18 communicates with the lift track 15 in the vertical support 14 and gravity feeds stored fasteners 17 thereto; the transversely inclined lip portion 19 directs the fasteners 17 to the longitudinally inclined storage portion 18 to facilitate proper feed therefrom. A pneumatically operated vibrator 20 is carried by the longitudinally inclined storage portion 18 to insure proper feed of the fasteners 17 to the lift track 15 and is operatively connected through a pneumatic supply hose 21 to a source of pressurized air.

A second hopper or storage container 22 adapted to store a plurality of the fasteners 17 is carried vertically above the first hopper 16 by the vertical support 14 and the walls 10a of the storage housing 10 upon the opposing side of the lift tracks 15 and 15a from the first hopper 16. The second hopper 22 longitudinally and transversely fills the cavity defined by the vertical support 14 and the supporting walls 10a to prevent the fasteners 17 from passing onto the base 11 below the second hopper 22. The second hopper 22 is formed to include a storage portion 23 which is longitudinally inclined from the vertical support 14 and a lip portion 24 which is transversely inclined from the longitudinally inclined storage portion 23. The transversely inclined lip portion 24 communicates with the lift track 15 in the vertical support 14 vertically above the communication of the first hopper 16 with the lift track 15; the longitudinally inclined storage portion 23 communicates with the lift track 15a in the vertical support 14 to feed stored fasteners 17 thereto. A pneumatically actuated vibrator 25 operatively connected through a pneumatic supply hose 26 to a source of pressurized air is mounted upon the second hopper 22 to insure proper feed of the fasteners 17 from the longitudinally inclined portion 23 to the lift track 15a.

Figure 3:
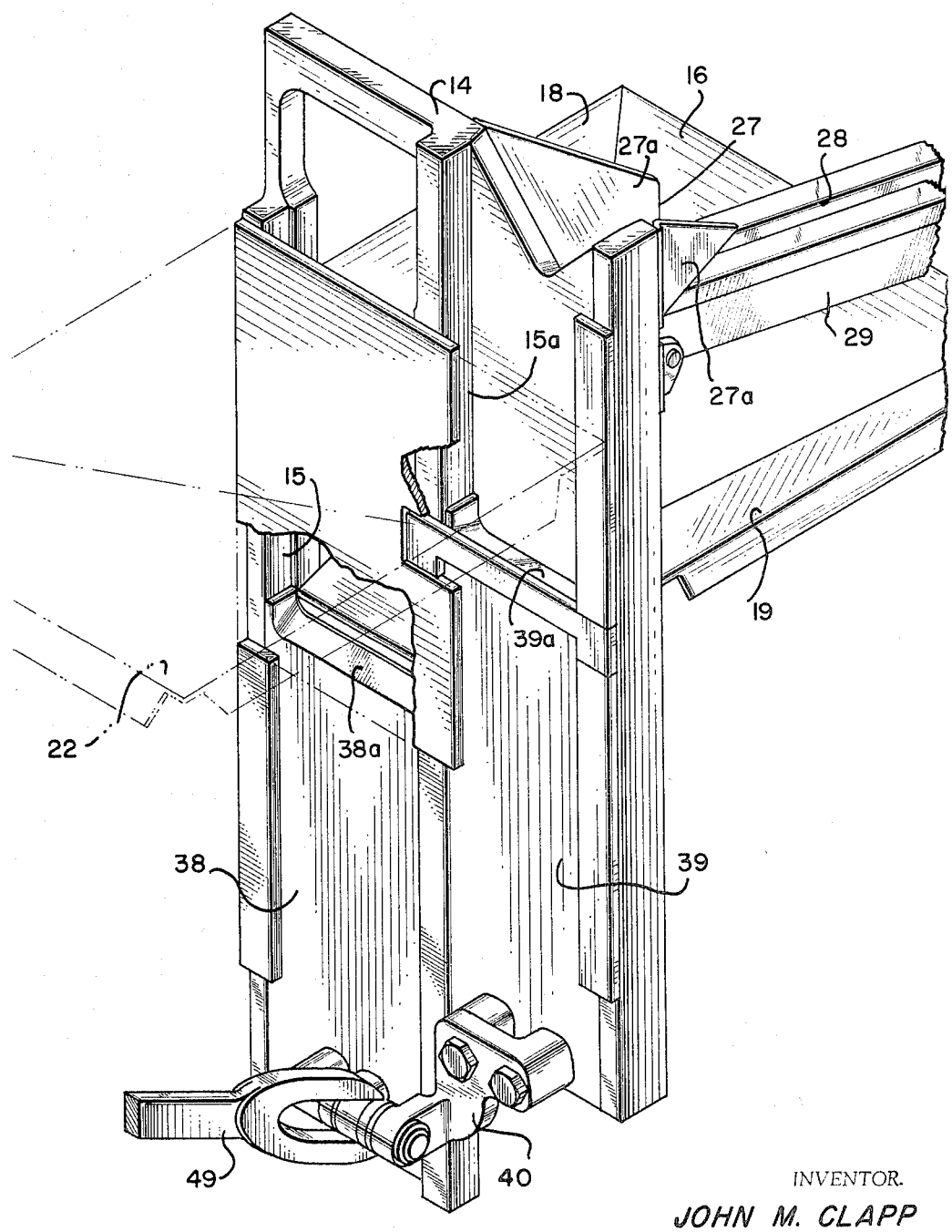
FIG. 3 is an enlarged view in perspective of the fastener-transfer apparatus of the storage and handling apparatus with one of the storage hoppers of the latter in phantom.

An orienting chute 27 having opposing inclined sides 27a is carried by the vertical support 14 in communication with the lift track 15a. The orienting chute 27, as illustrated in FIGS. 1 and 3, communicates with the lift track 15a vertically above the communication of the second hopper 22 with the lift track 15a. The orienting chute 27 is located vertically above the transversely inclined lip portion 19 of the first hopper 16 and declines theretowards. The lower end of the orienting chute 27 extends vertically above a raceway 28 formed on a raceway support 29 which is carried by the vertical support 14 and the walls 10a and is adapted to deliver fasteners 17 thereto. The raceway support 29 declines from the orienting chute 27 and communicates at its lower end with the fastener supply line (not shown) of the pneumatic insertion tool (not shown). An escapement or similar restraining means (not shown) may be located adjacent the juncture of the raceway support 29 and the fastener supply line to restrict the passage of the fasteners 17 from the raceway 28 into the fastener supply line.

A supporting bracket 30 is mounted upon the raceway support 29 and carries a raceway guide 31 for limited axial movement relative to the raceway support 29. The raceway guide 31 carries an aligning head 32 having a longitudinal channel 32a in alignment with the raceway 28. The aligning head 32 is adapted to permit only those fasteners 17 which are properly aligned in the raceway 28 to pass down the raceway 28 to the fastener supply line of the pneumatic insertion tool (not shown). More specifically, axial movement of the raceway guide 31 moves the aligning head 32 into contact with those fasteners 17 which are not properly aligned in the raceway 28 to force such either into proper alignment in the raceway 28, or alternatively, into the first hopper 16 which is located vertically below the raceway support 29.

Axial movement is transmitted to the raceway guide 31 by a linkage arm 33 which is connected to the raceway guide 31 and to a pivot pin 34 carried by a wall 10a of the storage housing 10. The linkage arm 33 includes a portion 35 which extends adjacent the lift track 15 and is biased by a spring 36 carried by a wall 10a of the storage housing 10. A collar 37 carried by the raceway support 29 encloses the linkage arm 33 to restrict the arcuate movement thereof to that required for the range of axial movement required from the raceway guide 29.

A first blade or elevating member 38 is disposed within the lift track 15 for limited vertical movement therein to deliver the fasteners 17, stored in the first hopper 16, to the second hopper 22. A second blade or elevating member 39 is disposed within the lift track 15a for limited vertical movement therein to deliver the fasteners 17, stored in the second hopper 22, to the orienting chute 27 and the raceway 29. The first and second blades 38 and 39, respectively, are connected by a blade carrying bracket 40 for simultaneous vertical movement.

The first blade 38 includes a fastener supporting surface 38a inclined towards the first hopper 16 and is vertically movable to locate the supporting surface 38a in alternative alignment with the longitudinally inclined storage portion 18 of the first hopper 16 and the transversely inclined lip portion 24 of the second hopper 22. The first blade 38 carries an actuating pin 41 adapted to engage the portion 35 of the linkage arm 33 to axially move the guide support 31 and is of sufficient length to prevent the fasteners 17 in the first hopper 16 from falling therefrom when the supporting surface 38a is aligned with the second hopper 22. The second blade 39 includes a fastener supporting surface 39a inclined towards the second hopper 22 and is vertically movable to locate the supporting surface 39a in alternate alignment with the longitudinally inclined storage portion 23 of the second hopper 22 and the orienting chute 27. The second blade member 39 is of sufficient length to prevent the fasteners 17 in the second hopper 22 from passing into the lift track 15a when the inclined surface 39a is aligned with the orienting chute 27.

The vertical movement of the first blade 38 and the second blade 39 is actuated by a pneumatic motor which is disposed within the cylinder housing 12. The pneumatic motor comprises a pneumatic cylinder 42 having a fluid port 42a adjacent one of its ends and a fluid port 42b adjacent the other of its ends. A piston 43 is disposed within the pneumatic cylinder 42 for axial movement therein in response to the flow of fluid through the fluid ports 42a and 42b and is carried by a piston rod 44. The piston rod 44 extends axially below the pneumatic cylinder 42 and carries a clevis or link member 45 adapted to open a spring biased poppet valve 46 interposed in a fluid port 47 in a poppet valve housing 47a carried by the cylinder housing 12 upon the extension of the piston rod 44 from the pneumatic cylinder 42. The cylinder housing 12 includes an exhaust opening 48 for exhausting the fluid entering from the fluid port 47 to atmosphere.

The clevis or link member 45 pivotally carries one end of a fork link 49 which is pivotally connected at its opposing end to the blade supporting bracket 40 and intermediate its ends to a support 50 carried by a wall 10a of the storage housing 10. The fork link 49 transmits longitudinal movement of the piston rod 44 into simultaneous vertical movement of the first blade 38 and the second blade 39 for transferring the fasteners 17 between the first hopper 16, the second hopper 22, and the orienting chute 27.

The pneumatic system for actuating the piston 42 is illustrated schematically in FIG. 4. As shown therein, 51 is a pneumatic supply line operatively connected to a continuous source of pressurized air (not shown); and 52 is a pneumatic signal line operatively connected to the pneumatic insertion tool (not shown) to receive pressurized air therefrom after the tool has driven a previously fed fastener 17 to depth. Control of the flow of the pressurized air through the pneumatic signal line 52 may be by means of a cam actuated plunger valve (not shown) adapted to be opened only after the pneumatic insertion tool has driven a fastener 17 to depth or by any other suitable means and does not form a part of the present invention.

As illustrated in FIG. 4, the pneumatic signal line 52 is operatively connected through a pneumatic supply hose 53 to the fluid port 47 in the poppet valve housing 47a to be exhausted upon the opening of the poppet valve 46 therein. The pneumatic signal line 52 functions to actuate a first spring biased control valve 54 and deactuates a second spring biased control valve 55. The first control valve 54 is interposed intermediate the communication of the pneumatic supply line 51 and a pneumatic supply line 56 communicating with the pneumatic supply hose 57 which is connected to the fluid port 42a of the pneumatic cylinder 42. The first control valve 54 is adapted to communicate the pneumatic supply lines 51 and 56 upon the passage of pressurized air through the pneumatic signal line 52. The second control valve 55 is interposed between the pneumatic supply line 51 and a pneumatic supply line 58 communicating with the pneumatic supply hose 59 which is connected to the fluid port 42b of the pneumatic cylinder 42. The second control valve 55 is adapted to prevent the passage of pressurized air from the pneumatic supply line 51 to the pneumatic supply line 58 when the pneumatic signal line 52 is pressurized. In order to control the exhausting of the pressurized air through the pneumatic supply hoses 57 and 59 to the exhaust lines 60 and 61, the restriction valves 62 and 63, respectively, are disposed therein.

The operation of the illustrated fastener storage and feeding apparatus is believed to be apparent from the foregoing description. However, a brief description of the operation of the apparatus herein follows for the purposes of simplicity and clarity of description.

With the pneumatic insertion tool (not shown) driving a fastener 17, the pneumatic signal line 52 is unpressurized. Thus, pressurized air from the pneumatic supply line 51 enters the pneumatic cylinder 42 through the pneumatic supply hose 59 to urge the piston 43 towards the upper end of the pneumatic cylinder 42. This movement of the piston 43 urges the first and second blades 38 and 39 adjacent the first and second hoppers 16 and 22, respectively, to receive fasteners 17 stored therein.

When, however, the driven fastener 17 reaches torque, pressurized air passing through the pneumatic supply line 52 opens the control valve 54 and simultaneously closes the control valve 55. Thus, pressurized air from the pneumatic signal line 51 then passes through the pneumatic supply hose 57 into the pneumatic cylinder 42 to urge the piston 43 towards the lower end thereof and, also, flows through the pneumatic supply hoses 21 and 26 to the vibrators 20 and 25, respectively.

The downward movement of the piston 43 effects vertical upward movement of the first and second blades 38 and 39 to transfer fasteners 17 to the second hopper 22 and the orienting chute 27, respectively. As the first blade 38 rises, the actuating pin 41 carried thereby engages the portion 35 of the linkage arm 33 to axially move the guide support 31 to properly align the fasteners 17 in the raceway 28. Any fasteners 17 falling from the raceway 28 due to this movement of the guide support 31 fall into the first hopper 16 for transfer to the second hopper 22 and the raceway 27 during succeeding cycles of the operation of the fastener storage and feeding apparatus.

Engagement of the poppet valve 46 by the clevis 45 exhausts the pneumatic supply line 52 to return the control valves 54 and 55 and institutes upward movement of the piston 43. This upward movement of the piston 43 causes vertically downward movement of the first and second blades 38 and 39 to return such to the first and second hoppers 16 and 22, respectively, for receiving fasteners 17 therefrom.

From the foregoing it will be seen that I have provided a new and improved storage and feeding apparatus particularly adapted for storing and feeding fasteners to a power operated tool, which apparatus is compact and economical in both construction and operation. It will also be seen that this apparatus includes an unusually large storage capacity relative to its overall size and includes fastener transfer means which operate in a dependable, efficient, and economical manner. It will further be seen that, although this apparatus is particularly adapted for storing fasteners and feeding such to a power operated insertion tool, the mere change of the raceway 29 to other suitable discharge means adapts such to store and feed other small mechanical parts such as pins, balls, nuts, and the like.

From the foregoing it will be seen that I have provided new and improved means for accomplishing all of the objects and advantages of my invention.

Having thus described my invention, I claim:

1. An apparatus for storing and feeding small mechanical parts, comprising:
   first storage means adapted for storing small mechanical parts;
   second storage means disposed in vertically spaced relationship to said first storage means and adapted for storing small mechanical parts;
   discharge means disposed in vertically spaced relationship to said first and second storage means and adapted for feeding small mechanical parts from the storage and feeding apparatus;
   first lift means vertically movable into alternative communicating relationship with said first storage means and said second storage means for transferring small mechanical parts from said first storage means to said second storage means;
   second lift means vertically movable into alternative communicating relationship with said second storage means and said discharge means for transporting small mechanical parts from said second storage means to said discharge means;
   said first and second lift means being disposed between said first and second storage means; and
   means operatively connected to said first and second lift means for vertically moving such into said communicating relationship with said first storage means and second storage means, and said second storage means and said discharge means, respectively.

2. An apparatus for storing and feeding small mechanical parts, comprising:
   first storage means adapted for storing small mechanical parts;
   second storage means disposed vertically above said first storage means and adapted for storing small mechanical parts;
   discharge means disposed vertically above said first and second storage means and adapted for feeding small mechanical parts from the storage and feeding apparatus;
   first lift means vertically movable into alternative communicating relationship with said first storage means and said second storage means for transferring small mechanical parts from said first storage means to said second storage means;
   second lift means vertically movable into alternative communicating relationship with said second storage means and said discharge means for transporting small mechanical parts from said second storage means to said discharge means;
   said first and second lift means being disposed between said first and second storage means; and
   means operatively connected to said first and second lift means for vertically moving such into said communicating relationship with said first storage means and said second storage means, and said second storage means and said discharge means, respectively.

3. A storage and feeding apparatus according to claim 2 wherein said discharge means is in vertical alignment with said first storage means.

4. An apparatus for storing and feeding small mechanical parts, comprising:
   a base;
   a first lift track carried by said base and extending vertically from said base;
   a second lift track carried by said base and extending vertically from said base;
   a first storage hopper for storing small mechanical parts disposed adjacent said first and second lift tracks in communication with said first lift track for discharging small mechanical parts thereto;
   a second storage hopper for storing small mechanical parts disposed adjacent said first and second lift tracks vertically above said first storage hopper;
   said second storage hopper communicating with said first lift track to receive small mechanical parts therefrom and with said second lift track to discharge small mechanical parts thereto;
   said first and second lift tracks being disposed in juxtaposed relationship between said first and second storage hoppers;
   discharge means for feeding small mechanical parts from the storage and feeding apparatus disposed adjacent said first and second lift tracks vertically above said first and second storage hoppers, said discharge means communicating with said second lift track to receive small mechanical parts therefrom;
   first lift means within said first lift track for vertical movement therein between said first and second storage hoppers for transferring small mechanical parts from said first storage hopper to said second storage hopper;
   second lift means within said second lift track for vertical movement therein between said second storage hopper and said discharge means for transferring small mechanical parts from said second storage hopper to said discharge means; and means operatively connected to said first and second lift means for effecting vertical movement thereof.

5. An apparatus for storing and feeding small mechanical parts, comprising:

a base;

a first lift track carried by said base and extending vertically from said base;

a second lift track carried by said base adjacent said first lift track and extending vertically from said base;

a first storage hopper for storing small mechanical parts disposed adjacent one side of said first and second lift tracks in communication with said first lift track for discharging small mechanical parts thereto;

a second storage hopper for storing small mechanical parts disposed adjacent the opposing side of said first and second lift tracks from said first storage hopper and vertically above said first storage hopper;

said second storage hopper communicating with said first lift track to receive small mechanical parts therefrom and with said second lift track to discharge small mechanical parts thereto;

discharge means for feeding small mechanical parts from the storage and feeding apparatus disposed adjacent said first and second lift tracks vertically above said first and second storage hoppers in vertical alignment with said first storage hopper, said discharge means communicating with said second lift track to receive small mechanical parts therefrom;

first lift means within said first lift track for vertical movement therein between said first and second storage hoppers for transferring small mechanical parts from said first storage hopper to said second storage hopper;

second lift means within said second lift track for vertical movement therein between said second storage hopper and said discharge means for transferring small mechanical parts from said second storage hopper to said discharge means; and means operatively connected to said first and second lift means for effecting vertical movement thereof.

6. An apparatus for storing and feeding small mechanical parts, comprising:

a base;

a first lift track carried by said base and extending vertically from said base;

a second lift track carried by said base adjacent said first lift track and extending vertically from said base;

a first storage hopper for storing small mechanical parts disposed adjacent one side of said first and second lift tracks in communication with said first lift track for discharging small mechanical parts thereto;

a second storage hopper for storing small mechanical parts disposed adjacent the opposing side of said first and second lift tracks from said first storage hopper and vertically above said first storage hopper;

said second storage hopper communicating with said first lift track to receive small mechanical parts therefrom and with said second lift track to discharge small mechanical parts thereto;

discharge means for feeding small mechanical parts from the storage and feeding apparatus disposed adjacent said first and second lift tracks vertically above said first and second storage hoppers in vertical alignment with said first storage hopper, said discharge means communicating with said second lift track to receive small mechanical parts therefrom;

first lift means within said first lift track for vertical movement therein between said first and second storage hoppers for transferring small mechanical parts stored in said first storage hopper to said second storage hopper;

second lift means within said second lift track for vertical movement therein between said second storage hopper and said discharge means for transferring small mechanical parts stored in said second storage hopper to said discharge means; and means operatively connected to said first and second lift means for effecting simultaneous vertical movement thereof.

7. An apparatus for storing and feeding small mechanical parts, comprising:

a substantially horizontal base;

a support carried by said base extending vertically therefrom and including a pair of vertically extending, juxtaposed lift tracks therein;

a first storage hopper for storing small mechanical parts carried by said support in communication with one of said lift tracks for delivering small mechanical parts thereto;

a second storage hopper for storing small mechanical parts carried by said support upon the opposing side of said lift tracks from said first storage hopper vertically above said first storage hopper;

said second storage hopper communicating with said one of said lift tracks for receiving small mechanical parts therefrom and with the other of said lift tracks for delivering small mechanical parts thereto;

a discharge chute for feeding small mechanical parts from the storage and feeding apparatus carried by said support vertically above and in vertical alignment with said first storage hopper;

said discharge chute communicating with said other of said lift tracks for receiving small mechanical parts therefrom;

first blade means within said one of said lift tracks for vertical movement therein between said first and second storage hoppers for transferring small mechanical parts stored in said first storage hopper to said second storage hopper;

second blade means within said other of said lift tracks for vertical movement therein between said second storage hopper and said discharge chute for transferring small mechanical parts stored in said second storage hopper to said discharge chute; and means operatively connected to said first and second blade means for effecting simultaneous vertical movement thereof.

8. An apparatus for storing and feeding small mechanical parts, comprising:

a substantially horizontal base;

a support carried by said base extending vertically therefrom and including a pair of vertically extending, juxtaposed lift tracks therein;

a first storage hopper for storing small mechanical parts carried by said support in communication with one of said lift tracks for delivering small mechanical parts thereto;

a second storage hopper for storing small mechanical parts carried by said support upon the opposing side of said lift tracks from said first storage hopper vertically above said first storage hopper;

said second storage hopper communicating with said one of said lift tracks for receiving small mechanical parts therefrom and with the other of said lift tracks for delivering small mechanical parts thereto;

a discharge chute for feeding small mechanical parts from the storage and feeding apparatus carried by said support vertically above and in vertical alignment with said first storage hopper;

said discharge chute communicating with said other of said lift tracks for receiving small mechanical parts therefrom;

first blade means within said one of said lift tracks for vertical movement therein between said first and second storage hoppers for transferring small mechanical parts stored in said first storage hopper to said second storage hopper;

second blade means within said other of said lift tracks for vertical movement therein between said second storage hopper and said discharge chute for transferring small mechanical parts stored in said second storage hopper to said discharge chute; and fluid operated means operatively connected to said first and second blade means for effecting simultaneous vertical movement thereof.

9. An apparatus for storing and feeding small mechanical parts, comprising:
 a substantially horizontal base;
 a support carried by said base extending vertically therefrom and including a pair of vertically extending, juxtaposed lift tracks therein;
 a first storage hopper for storing small mechanical parts carried by said support in communication with one of said lift tracks for gravity feeding small mechanical parts thereto;
 a second storage hopper for storing small mechanical parts carried by said support upon the opposing side of said lift tracks from said first storage hopper vertically above said first storage hopper;
 said second storage hopper communicating with said one of said lift tracks for receiving small mechanical parts therefrom and with the other of said lift tracks for gravity feeding small mechanical parts thereto;
 a discharge chute for gravity feeding small mechanical parts from the storage and feeding apparatus carried by said support vertically above and in vertical alignment with said first storage hopper;
 said discharge chute communicating with said other of said lift tracks for receiving small mechanical parts therefrom;
 first blade means within said one of said lift tracks for vertical movement therein between said first and second storage hoppers for transferring small mechanical parts stored in said first storage hopper to said second storage hopper;
 second blade means within said other of said lift tracks for vertical movement therein between said second storage hopper and said discharge chute for transferring small mechanical parts stored in said second storage hopper to said discharge chute; and
 means operatively connected to said first and second blade means for effecting simultaneous vertical movement thereof.

10. An apparatus for storing and feeding small mechanical parts, comprising:
 a base;
 a first lift track carried by said base and extending vertically from said base;
 a second lift track carried by said base adjacent said first lift track and extending vertically from said base;
 a first storage hopper for storing small mechanical parts disposed adjacent one side of said first and second lift tracks and communicating with said first lift track for discharging small mechanical parts thereto;
 a second storage hopper for storing small mechanical parts disposed adjacent the opposing side of said first and second lift tracks from said first storage hopper;
 said second storage hopper communicating with said first lift track vertically above the communication of said first storage hopper with said first lift track and also communicating with said second lift track;
 discharge means for feeding small mechanical parts from the storage and feeding apparatus disposed adjacent said first and second lift tracks in vertical alignment with said first storage hopper, said discharge means communicating with said second lift track vertically above the communication of said second storage hopper with said second lift track;
 first lift means within said first lift track for vertical movement therein between said first and second storage hoppers for transferring small mechanical parts stored in said first storage hopper to said second storage hopper;
 second lift means within said second lift track for vertical movement therein between said second storage hopper and said discharge means for transferring small mechanical parts stored in said second storage hopper to said discharge means; and
 means operatively connected to said first and second lift means for effecting simultaneous vertical movement thereof.

11. An apparatus for storing and feeding small mechanical parts, comprising:
 a base;
 a first lift track carried by said base and extending vertically from said base;
 a second lift track carried by said base adjacent said first lift track and extending vertically from said base;
 a first storage hopper for storing small mechanical parts disposed adjacent one side of said first and second lift tracks and communicating with said first lift track for discharging small mechanical parts thereto;
 a second storage hopper for storing small mechanical parts disposed adjacent the opposing side of said first and second lift tracks from said first storage hopper;
 said second storage hopper communicating with said first lift track vertically above the communication of said first storage hopper with said first lift track and also communicating with said second lift track;
 discharge means for feeding small mechanical parts from the storage and feeding apparatus disposed adjacent said first and second lift tracks in vertical alignment with said first storage hopper, said discharge means communicating with said second lift track vertically above the communication of said second storage hopper with said second lift track;
 first lift means within said first lift track for vertical movement therein between said first and second storage hoppers for transferring small mechanical parts from said first storage hopper to said second storage hopper;
 second lift means within said second lift track for vertical movement therein between said second storage hopper and said discharge means for transferring small mechanical parts from said second storage hopper to said discharge means; and
 means operatively connected to said first and second lift means for effecting vertical movement thereof.

12. A storage and feeding apparatus according to claim 11, wherein said first and second lift tracks are disposed in juxtaposed relationship, and said first and second storage hoppers incline from said first and second lift tracks, respectively, such that small mechanical parts contained in said hoppers are gravity fed to the lift means in said lift tracks.

13. A storage and feeding apparatus according to claim 12, wherein means are connected to said first and second storage hoppers for vibrating said hoppers to facilitate the feed of small mechanical parts to said lift means.

14. A storage and feeding apparatus according to claim 12, wherein a raceway communicates with said discharge means to receive small mechanical parts from said discharge means, and means are operatively connected to said lift means and said raceway to align small mechanical parts in said raceway in response to movement of said lift means.

15. A storage and feeding apparatus according to claim 14, wherein said said aligning means comprises a member disposed above said raceway and movable relative to said raceway, and linkage means connecting said member with said lift means to move said member in response to movement of said lift means.

16. A storage and feeding apparatus according to claim 15, wherein said raceway extends in vertical alignment with said first storage hopper such that small mechanical parts dropping from said raceway fall into said first storage hopper.

References Cited by the Examiner

UNITED STATES PATENTS

| | | | |
|---|---|---|---|
| 935,401 | 9/1909 | Petersen | 221—93 |
| 1,687,134 | 10/1928 | Lynch et al. | 221—175 |
| 1,696,803 | 12/1928 | Kronqvist | 221—238 |
| 2,108,694 | 2/1938 | Smith et al. | 221—254 |
| 2,791,069 | 5/1957 | Cleiff | 221—254 |
| 2,819,465 | 1/1958 | McIlvin | 221—254 |
| 3,012,344 | 12/1961 | Schott | 221—175 |
| 3,058,618 | 10/1962 | Loveland et al. | 221—238 |
| 3,133,670 | 5/1964 | Heyer | 221—175 |

ROBERT B. REEVES, *Primary Examiner.*

WALTER SOBIN, *Examiner.*